US012583084B2

(12) United States Patent
Andrews

(10) Patent No.: US 12,583,084 B2
(45) Date of Patent: Mar. 24, 2026

(54) DRIVE PLATE SYSTEMS, METHODS, AND APPARATUS FOR A PRESS TOOL

(71) Applicant: Tiger Tool International Incorporated, Abbotsford (CA)

(72) Inventor: Michael Andrews, Bellingham, WA (US)

(73) Assignee: Tiger Tool International Incorporated, Abbotsford (CA)

( * ) Notice: Subject to any disclaimer, the term of this patent is extended or adjusted under 35 U.S.C. 154(b) by 134 days.

(21) Appl. No.: 18/405,887

(22) Filed: Jan. 5, 2024

(65) Prior Publication Data

US 2024/0227140 A1 Jul. 11, 2024

Related U.S. Application Data

(60) Provisional application No. 63/478,892, filed on Jan. 6, 2023.

(51) Int. Cl.
*B25B 27/02* (2006.01)

(52) U.S. Cl.
CPC .................................. *B25B 27/023* (2013.01)

(58) Field of Classification Search
CPC ... B25B 27/023; B25B 27/062; F16B 37/045; F16B 37/046; F16B 37/047
See application file for complete search history.

(56) References Cited

U.S. PATENT DOCUMENTS

| | | | |
|---|---|---|---|
| 569,527 | A | 10/1896 | Tilton |
| 689,154 | A | 12/1901 | Bartlett |
| 1,131,868 | A | 3/1915 | Ridlon |
| 1,155,720 | A | 10/1915 | Louis |
| 1,171,590 | A | 2/1916 | Campbell |
| 1,334,658 | A | 3/1920 | Koch |

(Continued)

FOREIGN PATENT DOCUMENTS

| | | | |
|---|---|---|---|
| AU | 2015200375 | A1 | 8/2015 |
| AU | 2015200630 | A1 | 8/2015 |

(Continued)

OTHER PUBLICATIONS

USPTO Machine Translation (retrieved from FIT database) of the Description of BR PI0600706 A, Klann, Nov. 7, 2006. (Year: 2025).*

(Continued)

*Primary Examiner* — Daniel D Yabut
(74) *Attorney, Agent, or Firm* — Schacht Law Office, Inc.; Michael R. Schacht; Bronte Brillantes

(57) ABSTRACT

A drive plate assembly for a king pin removal tool comprising a drive member, the drive plate assembly comprises a drive plate and an insert. The drive plate defines a main opening and a flange recess. The insert comprises a shaft portion and a flange portion and defining a drive opening. The insert is arranged such that the shaft portion is within the main opening, the flange portion is within the flange recess, and the drive member is adapted to be threaded into the drive opening. When the drive member is received within the drive opening and axially rotated relative to the insert, a drive force applied by the drive member forces the flange portion of the insert against a surface of the drive plate defining at least a portion of the flange recess.

24 Claims, 5 Drawing Sheets

(56) References Cited

U.S. PATENT DOCUMENTS 1,368,760 A 2/1921 Schilling
1,408,993 A 3/1922 Ulrich
1,429,567 A 9/1922 Carlisle
1,442,626 A 1/1923 Mcgee
1,476,983 A 12/1923 King
1,498,638 A 6/1924 Periolat
1,552,616 A 9/1925 Jake
1,650,964 A 11/1927 Schmitt
1,682,956 A 9/1928 Dawson et al.
1,778,802 A 10/1930 Howell
1,817,988 A 8/1931 Emal
1,849,805 A 3/1932 Raymond
1,857,211 A 5/1932 Odlum et al.
1,990,570 A 2/1935 Smith
1,996,967 A 4/1935 Kratky
2,036,782 A 4/1936 Ullmo
2,052,534 A 8/1936 Quarles
2,085,529 A 6/1937 Heimbach et al.
2,290,427 A 7/1942 Harrington
2,366,467 A 1/1945 Anderson
2,374,861 A 5/1945 Graham
2,380,980 A 8/1945 Looney
2,427,948 A 9/1947 Cornwell
2,484,129 A 10/1949 Taylor
2,549,429 A 4/1951 Cowles
2,681,501 A 6/1954 Albert
2,755,540 A 7/1956 Crozier
2,798,392 A 7/1957 Randolph
3,102,333 A 9/1963 Thornton et al.
3,110,958 A 11/1963 Mccord
3,123,901 A 3/1964 Traugott
3,200,483 A 8/1965 Menegoni
3,200,484 A 8/1965 Garman
3,237,291 A 3/1966 Kelso
3,327,377 A 6/1967 German
3,336,652 A 8/1967 Andre
3,408,724 A 11/1968 Hoeijenbos
3,662,449 A 5/1972 Hashimoto
3,742,570 A 7/1973 Felser
3,785,050 A 1/1974 Whitledge et al.
3,862,483 A 1/1975 Kloster
3,936,005 A 2/1976 Schnell
3,964,149 A 6/1976 Hugh
4,034,458 A 7/1977 Ford et al.
4,195,398 A 4/1980 Matthews
4,207,664 A 6/1980 Zoula
4,363,475 A 12/1982 McCarty
4,398,706 A 8/1983 Kaulfuss
4,426,758 A 1/1984 Castoe
4,428,105 A 1/1984 Abbott et al.
4,476,750 A 10/1984 Murphy
4,507,838 A 4/1985 Hacker
4,589,180 A 5/1986 Vachon
4,619,027 A 10/1986 Ohannesian
4,624,039 A 11/1986 Lawrence et al.
4,648,166 A 3/1987 Tilman
4,649,615 A 3/1987 Hundley
4,672,731 A 6/1987 Taylor
4,691,424 A 9/1987 Michael et al.
4,709,459 A 12/1987 Klann
4,765,057 A 8/1988 Muller
4,769,890 A 9/1988 Maynard
4,770,401 A 9/1988 Donaldson
4,771,528 A 9/1988 Stromberg
4,867,366 A 9/1989 Kleinholz
4,940,370 A 7/1990 Gipson
4,941,252 A 7/1990 Haisch et al.
4,976,280 A 12/1990 Lagana
4,977,660 A 12/1990 Maynard
4,989,312 A 2/1991 Maddalena
5,025,542 A 6/1991 Jacks
5,119,556 A 6/1992 Hseu
5,125,324 A 6/1992 Araki et al.
5,159,743 A 11/1992 Somerville
5,163,665 A 11/1992 Klearman
5,174,005 A 12/1992 Somerville
5,181,303 A 1/1993 Gregg
5,210,919 A 5/1993 Garman
5,211,211 A 5/1993 Rubino et al.
D336,599 S 6/1993 Rubino
5,224,254 A 7/1993 McPeak et al.
5,233,741 A 8/1993 Maynard
D339,814 S 9/1993 Pepper
5,255,435 A 10/1993 Shultz
5,257,445 A 11/1993 Mayberry
5,271,136 A 12/1993 Skoworodko
5,341,553 A 8/1994 Herzhauser
5,350,183 A 9/1994 Shealy
5,355,574 A 10/1994 Zweekly et al.
5,373,636 A 12/1994 Martinie
5,390,404 A 2/1995 Rubino et al.
5,419,027 A 5/1995 McPeak et al.
D359,670 S 6/1995 Cutter
5,479,688 A 1/1996 Rubino et al.
5,519,929 A 5/1996 Bleckman
5,535,973 A 7/1996 Bailey et al.
5,557,833 A 9/1996 Pool
D376,970 S 12/1996 Drake
5,586,378 A 12/1996 Smith
5,606,788 A 3/1997 Rubino et al.
5,692,437 A 12/1997 Tabain
5,787,561 A 8/1998 Harmand
5,839,180 A 11/1998 Hochmiller
RE36,009 E 12/1998 Shultz
5,857,252 A 1/1999 Jansen
5,887,328 A 3/1999 Rydin et al.
5,893,202 A 4/1999 Graham et al.
5,898,985 A 5/1999 Villarreal
5,983,474 A 11/1999 Koppe
D424,076 S 5/2000 Dibbern et al.
6,092,279 A 7/2000 Shoup
6,158,110 A 12/2000 Takacs
6,192,566 B1 2/2001 Dunum
6,227,030 B1 5/2001 Lefavour et al.
6,249,958 B1 6/2001 Bubino et al.
D445,805 S 7/2001 Bruns
D447,020 S 8/2001 Kapellas et al.
6,431,534 B1 8/2002 Orosz et al.
6,434,809 B1 8/2002 Khurana
6,505,390 B2 1/2003 Emanuel
6,574,843 B1 6/2003 Meadows
6,601,277 B1 8/2003 Swanson
6,618,920 B1 9/2003 Emanuel
6,619,101 B1 9/2003 Faucher et al.
D485,286 S 1/2004 Pinchot
6,716,218 B2 4/2004 Holmes et al.
6,718,870 B1 4/2004 Frenken
D496,377 S 9/2004 Pinchot
6,789,791 B2 9/2004 Genduso
7,003,877 B2 2/2006 Reale
7,020,944 B2 4/2006 Klann
7,093,809 B2 8/2006 Hwang
7,111,488 B2 9/2006 Lefavour et al.
7,117,573 B1 10/2006 Hu
7,124,619 B1 10/2006 Lefavour et al.
7,213,317 B2 5/2007 Hu
7,219,885 B2 5/2007 Nardozza
D555,681 S 11/2007 Popov
7,387,296 B2 6/2008 Alberti
7,475,465 B1 1/2009 Weiss
D591,128 S 4/2009 Chuan
7,520,041 B1 4/2009 Aguilar
D609,552 S 2/2010 Anderson et al.
7,669,305 B1 3/2010 Lionberg
7,669,306 B2 3/2010 Palka
7,685,688 B2 3/2010 Fan
7,707,709 B2 5/2010 Whitehead
7,717,573 B2 5/2010 Matsubara et al.
7,726,998 B2 6/2010 Siebens
7,762,117 B2 7/2010 Faucher et al.
7,818,860 B2 10/2010 Hume et al.
D626,977 S 11/2010 Popov
D633,183 S 2/2011 Heintzman
7,890,305 B2 2/2011 Lionberg

(56) References Cited

U.S. PATENT DOCUMENTS

| | | | | |
|---|---|---|---|---|
| 7,891,084 | B1 | 2/2011 | Sollami | |
| 7,895,723 | B2 | 3/2011 | Wridt et al. | |
| 7,918,003 | B2 | 4/2011 | Acciardo, Jr. | |
| 7,954,225 | B2 | 6/2011 | Webb | |
| 7,996,972 | B2 | 8/2011 | Hu | |
| 8,079,123 | B2 | 12/2011 | Lin | |
| D651,499 | S | 1/2012 | Tong | |
| 8,146,223 | B2 | 4/2012 | Ebert | |
| 8,205,529 | B1 | 6/2012 | Laurie | |
| 8,256,081 | B2 | 9/2012 | Fridman | |
| D675,238 | S | 1/2013 | Launius, Jr. | |
| 8,387,252 | B1 | 3/2013 | Johnson et al. | |
| RE44,515 | E | 10/2013 | Ciungan et al. | |
| 8,567,292 | B1 | 10/2013 | Park et al. | |
| D692,729 | S | 11/2013 | Wessels | |
| 8,573,608 | B2 | 11/2013 | Palmer | |
| 8,627,557 | B2 | 1/2014 | Jansen et al. | |
| 8,689,420 | B2 | 4/2014 | Barrios et al. | |
| D707,717 | S | 6/2014 | King | |
| 8,745,832 | B2 | 6/2014 | Barrios et al. | |
| D712,013 | S | 8/2014 | Mather et al. | |
| D719,001 | S | 12/2014 | Robinson et al. | |
| D734,436 | S | 7/2015 | Raether | |
| 9,107,719 | B2 | 8/2015 | Gauthier | |
| 9,120,215 | B2 | 9/2015 | Muenchrath et al. | |
| 9,163,378 | B2 | 10/2015 | Doan et al. | |
| D742,692 | S | 11/2015 | Petrie | |
| D753,269 | S | 4/2016 | Yamagishi et al. | |
| D774,360 | S | 12/2016 | Piccinini | |
| 9,511,488 | B2 * | 12/2016 | Andrews | B25B 27/023 |
| 9,651,093 | B2 | 5/2017 | Robb, Jr. | |
| D791,395 | S | 7/2017 | Rashidi | |
| 9,701,179 | B2 | 7/2017 | Bernardo | |
| D793,971 | S | 8/2017 | Krishnan et al. | |
| D793,972 | S | 8/2017 | Krishnan et al. | |
| 9,718,177 | B1 | 8/2017 | Bell | |
| 9,751,199 | B2 | 9/2017 | Andrews et al. | |
| 9,774,159 | B2 | 9/2017 | Hamm et al. | |
| 9,808,922 | B2 | 11/2017 | Breschi et al. | |
| 9,908,208 | B2 | 3/2018 | Andrews et al. | |
| 9,956,674 | B2 | 5/2018 | Hargrove et al. | |
| 9,981,368 | B2 | 5/2018 | Zeren et al. | |
| 10,005,175 | B2 | 6/2018 | Morris | |
| D830,147 | S | 10/2018 | Lefavour et al. | |
| D830,981 | S | 10/2018 | Jeong et al. | |
| 10,160,043 | B2 | 12/2018 | Barezzani et al. | |
| 10,179,397 | B1 | 1/2019 | Hunter | |
| D844,768 | S | 4/2019 | Scott et al. | |
| 10,265,839 | B1 | 4/2019 | Hunter | |
| D847,882 | S | 5/2019 | King | |
| 10,307,901 | B2 | 6/2019 | Andrews et al. | |
| D858,591 | S | 9/2019 | Koch | |
| 10,486,293 | B2 | 11/2019 | Verkley | |
| D874,870 | S | 2/2020 | Parker | |
| 10,583,546 | B2 | 3/2020 | Yang | |
| 10,668,604 | B2 | 6/2020 | Caywood et al. | |
| 10,744,627 | B2 | 8/2020 | Andrews | |
| 10,906,140 | B2 | 2/2021 | Andrews et al. | |
| 10,987,788 | B2 | 4/2021 | Andrews | |
| D924,824 | S | 7/2021 | Kouzuma et al. | |
| 11,090,788 | B2 | 8/2021 | Huang | |
| 11,135,711 | B2 | 10/2021 | Andrews | |
| 11,267,113 | B1 | 3/2022 | Tice | |
| 11,285,583 | B2 | 3/2022 | Stuart et al. | |
| 11,370,093 | B2 | 6/2022 | Kochie et al. | |
| D962,398 | S | 8/2022 | Barreto | |
| 11,786,998 | B2 | 10/2023 | Peng et al. | |
| 2001/0029655 | A1 | 10/2001 | Emanuel | |
| 2001/0052558 | A1 | 12/2001 | Younker | |
| 2002/0095759 | A1 | 7/2002 | Scott | |
| 2003/0010160 | A1 | 1/2003 | Dugan | |
| 2003/0033909 | A1 | 2/2003 | Gore | |
| 2003/0084555 | A1 | 5/2003 | Meggiolan | |
| 2003/0106197 | A1 | 6/2003 | Emanuel | |
| 2003/0188566 | A1 | 10/2003 | Lefavour et al. | |
| 2005/0071973 | A1 | 4/2005 | Emanuel | |
| 2005/0160886 | A1 | 7/2005 | Eggert et al. | |
| 2006/0037184 | A1 | 2/2006 | Miller | |
| 2006/0070221 | A1 | 4/2006 | Wridt et al. | |
| 2006/0075617 | A1 | 4/2006 | Toosky et al. | |
| 2006/0112530 | A1 | 6/2006 | Rubino et al. | |
| 2006/0162509 | A1 | 7/2006 | Wang | |
| 2007/0251076 | A1 | 11/2007 | Zhong et al. | |
| 2008/0048375 | A1 | 2/2008 | Rolfe et al. | |
| 2008/0235930 | A1 | 10/2008 | English | |
| 2008/0289841 | A1 | 11/2008 | Kang | |
| 2009/0025514 | A1 | 1/2009 | Barrios et al. | |
| 2009/0211094 | A1 | 8/2009 | Adelman | |
| 2010/0000749 | A1 | 1/2010 | Andel | |
| 2010/0015834 | A1 | 1/2010 | Siebens | |
| 2010/0192348 | A1 | 8/2010 | Rubino et al. | |
| 2010/0236039 | A1 | 9/2010 | Robledo | |
| 2010/0251528 | A1 | 10/2010 | Hu | |
| 2010/0281665 | A1 | 11/2010 | Punaro | |
| 2010/0283193 | A1 | 11/2010 | Huang | |
| 2011/0048649 | A1 | 3/2011 | Komatsu et al. | |
| 2011/0094076 | A1 | 4/2011 | Liu | |
| 2011/0219617 | A1 | 9/2011 | Barrios et al. | |
| 2012/0110815 | A1 | 5/2012 | Brown | |
| 2012/0272499 | A1 | 11/2012 | Schley et al. | |
| 2013/0026692 | A1 | 1/2013 | Prins | |
| 2013/0074306 | A1 | 3/2013 | Muenchrath et al. | |
| 2013/0133175 | A1 | 5/2013 | Doan et al. | |
| 2014/0338166 | A1 | 11/2014 | Studney | |
| 2014/0345104 | A1 | 11/2014 | Andrews et al. | |
| 2014/0366954 | A1 | 12/2014 | Miller et al. | |
| 2015/0183102 | A1 | 7/2015 | Breschi et al. | |
| 2015/0183268 | A1 | 7/2015 | Baldassara et al. | |
| 2015/0209918 | A1 | 7/2015 | Andrews | |
| 2015/0224635 | A1 | 8/2015 | Andrews | |
| 2015/0230939 | A1 | 8/2015 | Froidevaux et al. | |
| 2015/0288125 | A1 | 10/2015 | Sneath | |
| 2015/0290785 | A1 | 10/2015 | Zimmer et al. | |
| 2016/0151867 | A1 * | 6/2016 | Chen | B25B 27/062<br>29/261 |
| 2017/0057040 | A1 | 3/2017 | Rzasa et al. | |
| 2017/0100825 | A1 | 4/2017 | Zeren et al. | |
| 2017/0209994 | A1 | 7/2017 | Hargrove et al. | |
| 2017/0248181 | A1 | 8/2017 | Wang | |
| 2017/0297152 | A1 | 10/2017 | Andrews | |
| 2017/0307020 | A1 | 10/2017 | Andrews | |
| 2017/0361438 | A1 | 12/2017 | Andrews | |
| 2018/0085909 | A1 | 3/2018 | Koski et al. | |
| 2018/0207776 | A1 | 7/2018 | Andrews | |
| 2018/0363693 | A1 | 12/2018 | Yokomatsu | |
| 2018/0370002 | A1 | 12/2018 | Andrews | |
| 2019/0070716 | A1 | 3/2019 | Andrews | |
| 2019/0160639 | A1 | 5/2019 | Lefavour et al. | |
| 2019/0244751 | A1 | 8/2019 | Broghammer | |
| 2020/0039041 | A1 | 2/2020 | Huang | |
| 2021/0285499 | A1 | 9/2021 | Andrews | |
| 2021/0387316 | A1 | 12/2021 | Andrews | |
| 2022/0063069 | A1 | 3/2022 | Crump | |
| 2022/0063071 | A1 | 3/2022 | Andrews | |

FOREIGN PATENT DOCUMENTS

| | | | | |
|---|---|---|---|---|
| AU | 2015334596 | A1 | | 5/2017 |
| AU | 2015335682 | A1 | | 5/2017 |
| AU | 2015200630 | B2 | | 5/2018 |
| AU | 2017225956 | A1 | | 8/2018 |
| AU | 2017248765 | A1 | | 9/2018 |
| AU | 2015200375 | B2 | | 7/2019 |
| AU | 2017248765 | B2 | | 11/2021 |
| AU | 2021234318 | A1 | | 10/2022 |
| AU | 2022201899 | A1 | | 10/2022 |
| BR | PI0600706 | A | * | 11/2006 |
| CA | 234055 | A | | 9/1923 |
| CA | 234525 | A | | 9/1923 |
| CA | 236911 | A | | 1/1924 |
| CA | 236912 | A | | 1/1924 |
| CA | 236913 | A | | 1/1924 |
| CA | 2037021 | A1 | | 8/1995 |
| CA | 2852069 | A1 | | 11/2014 |

(56) References Cited

FOREIGN PATENT DOCUMENTS

| | | | |
|---|---|---|---|
| CA | 2880139 | A1 | 7/2015 |
| CA | 2881390 | A1 | 8/2015 |
| CA | 2890557 | A1 | 10/2015 |
| CA | 2965264 | A1 | 4/2016 |
| CA | 2965324 | A1 | 4/2016 |
| CA | 3015834 | A1 | 9/2017 |
| CA | 3015852 | A1 | 10/2017 |
| CA | 2852069 | C | 1/2019 |
| CA | 2881390 | C | 4/2019 |
| CA | 3037021 | A1 | 9/2019 |
| CA | 2880139 | C | 12/2019 |
| CA | 2890557 | C | 10/2020 |
| CA | 3015834 | C | 5/2021 |
| CA | 3176714 | A1 | 9/2021 |
| CA | 3187064 | A1 | 12/2021 |
| CA | 3128996 | A1 | 2/2022 |
| CN | 106414122 | A | 2/2017 |
| DE | 1741595 | U | 3/1957 |
| DE | 19631524 | C1 | 11/1997 |
| DE | 20113561 | U1 | 11/2001 |
| DE | 10221280 | C1 | 8/2003 |
| DE | 20311755 | U | 10/2003 |
| DE | 202006000788 | U1 | 5/2006 |
| EP | 0988937 | A2 | 3/2000 |
| EP | 2461061 | A2 | 6/2012 |
| EP | 3423238 | A1 | 1/2019 |
| EP | 3442751 | A1 | 2/2019 |
| EP | 3423238 | A4 | 11/2019 |
| EP | 3442751 | A4 | 1/2020 |
| EP | 3678820 | A | 7/2020 |
| EP | 3678820 | A1 | 7/2020 |
| EP | 3678820 | A4 | 6/2021 |
| FR | 2387090 | A1 | 11/1978 |
| FR | 2670703 | A1 | 6/1992 |
| GB | 2047369 | A | 11/1980 |
| JP | 104800 | | 9/1974 |
| JP | S49104800 | U | 10/1974 |
| JP | S57116178 | A | 7/1982 |
| JP | S62192877 | U | 8/1987 |
| JP | 192877 | | 12/1987 |
| JP | H0192877 | A | 4/1989 |
| JP | H04105881 | A | 4/1992 |
| JP | H104800 | A | 1/1998 |
| JP | 3104800 | U | 10/2004 |
| JP | 4105881 | B2 | 6/2008 |
| JP | 3160459 | U | 6/2010 |
| JP | 3192877 | U | 9/2014 |
| KR | 100746562 | B1 | 8/2007 |
| KR | 101746033 | B1 | 6/2017 |
| MX | 2022003342 | A | 9/2022 |
| RU | 2028933 | C1 | 2/1995 |
| SU | 654401 | A2 | 3/1979 |
| SU | 1207744 | A1 | 1/1986 |
| SU | 1384368 | A1 | 3/1988 |
| SU | 1505740 | A1 | 9/1989 |
| SU | 1632766 | A1 | 3/1991 |
| TW | 306377 | U | 5/1997 |
| TW | 471371 | U | 1/2002 |
| TW | M342918 | U | 10/2008 |
| TW | M497081 | U | 3/2015 |
| WO | 2011012552 | A1 | 2/2011 |
| WO | 2016063140 | A2 | 4/2016 |
| WO | 2016065311 | A1 | 4/2016 |
| WO | 2017151953 | A1 | 9/2017 |
| WO | 2017181078 | A1 | 10/2017 |
| WO | 2019050989 | A1 | 3/2019 |
| WO | PCTUS2137271 | | 1/2021 |
| WO | 2021183800 | A1 | 9/2021 |
| WO | 2021257477 | A1 | 12/2021 |

OTHER PUBLICATIONS amazon.com, [Anti-Spill Cup Holder], date first available May 18, 2020 [online], [site visited May 19, 2023], available from the internet URL; https://amazon.com/Anti-Spill-Holder-Coaster-Anti-Slip-Outdoors/dp/B08L8MWXJY (Year: 2020).

amazon.com, Slack Adjuster Rod Pin Press, 2023, https://tigertool.com/en-ausnzl/collections/10406-10407-10409-10410-10501-10502-for-pitman-arm-lander/products/slack-adjuster-rod-pin-press, 14 pages.

amazon.com, Tiger Tool Brake Clevis Pin Press for Commercial Heavy Duty Transportation Trucks and Equipment, Brake Clevis Pin Press Tool for use with Class 6-8 Trucks, 10501, https://www.amazon.com.au/Tiger-10501-Brake-Clevis-Press/dp/B0002UNPQY, 2012, 3 pages.

amazon.com, Tiger Tool Slack Adjuster Rod Pin Press 10502, 2016, https://www.amazon.com.au/Tiger-Tool-Slack-Adjuster-10502/dp/B01AB36OIC/ref=sr_1_9?dib=eyJ2ljoiMSJ9.kJqFbxn3zDBMzVTm80ncmGgLy3660myn-UOYuPIKUfo0QIg2rcdJTeSliABupdsiAyKqCsh_v5-RgeqVWoXRdsQI6U6ONHMybFAgW6czZOj9xm83DaQ23comw8SnsUjCf-j_pYVcUvBYvtVexYgKRU57-HIIRCJctfOGe6qBP3cduWbCYPqrhHVGxpS_kuuUYbNafOHa1UzK5ZGRHNDUAZTZMXyTAeqbj5gndU07CTUvJHAZ.

Canadian Intellectual Property Office, "Office Action, Application No. 2,880,139,", Jan. 7, 2019, 3 p.

European Registration Serial No. 001348411-0001; Beverage Holders; Inventor Thomas J. Shaw; Registered Oct. 23, 2012; Published Apr. 9, 2013; 3 pages.

Greenerd, "Arbor Press History," Website http://www.greenerd.com/about-greenerd/history/default.aspxp. 2, predates Mar. 13, 2020, 5 pages.

International Searching Authority, International Search Report and Written Opinion, PCT/IB2015/002481, May 10, 2016, 6 pages.

International Searching Authority, International Search Report, Apr. 25, 2023, 2 pages.

International Searching Authority, ISR & Written Opinion, PCT/CA2024/050014, Mar. 27, 2024, 10 pages.

International Searching Authority, ISR & Written Opinion, PCT/IB2015/002481, May 10, 2017, 6 pages.

International Searching Authority, ISR & Written Opinion, PCT/US2015/057201, Dec. 22, 2015, 9 pages.

International Searching Authority, ISR & Written Opinion, PCT/US2017/020496, Jun. 1, 2017, 7 pages.

International Searching Authority, ISR & Written Opinion, PCT/US2017/027724, Aug. 17, 2017, 7 pages.

International Searching Authority, ISR & Written Opinion, PCT/US2018/049608, Dec. 6, 2018, 8 pages.

International Searching Authority, ISR & Written Opinion, PCT/US2021/021963, Jun. 3, 2021, 7 pages.

International Searching Authority, ISR & Written Opinion, PCT/US2021/037271, Jun. 15, 2020, 6 pages.

International Searching Authority, Written Opinion of the International Searching Authority, Apr. 25, 2023, 7 pages.

Michael Andrews (Tiger Tool international Incorporated); Frame for a Press Tool, Australian Design No. 202510469; Filed Jan. 21, 2025; Registered Mar. 31, 2025.

OTC, "Wheel Stud Remover/Installer," Product Brochure, 2009, 1 page, Product No. 5195.

OTC, "Wheel Stud Service Kit," Product Brochure, 2012, 1 page, Product No. 4295.

Registration Serial No. 302647759; Country China; Feeding Bottle Protective Sleeve; Inventor—Du Yaodong; Granted Nov. 20, 2013; 3 pages.

Semenov V. M., "Non-standard tool for dismantling and assembly work", Moskva, Izdatelstvopages 200-201, 219, 220, 253, 254, 257.

Tiger Tool, Brake Clevis Pin Press, 2023, 13 pages.

Tiger Tool, Product Brochure, 2023, 2 pages.

Toyota, "4Runner Repair Manual, Inspection and Repair of Front Axle Hub" 1990, pp. 1 and SA-18, vol. 2Publication No. RM143U2.

USPTO, "Final Office Action, U.S. Appl. No. 14/616,693," May 3, 2017, 10 pages.

USPTO, "Non-Final Office Action, U.S. Appl. No. 15/520,196," Apr. 2, 2019, 8 pages.

Wikipedia, "Hydraulic Press," Website http://en.wikipedia.org/wiki/Hydraulic-pressp., predates Mar. 13, 2020, 1.

(56) References Cited

OTHER PUBLICATIONS youtube.com, 10501—Tiger Tool Brake Clevis Pin Press, https://www.youtube.com/watch?v=C24OqjDWTsc, 2009, 1 page.
T Equipment; Burndy T444SBHF—Hypress 11-Ton Dieless C-Head Remote Hydraulic Crimper with Female Couplers; Jun. 8, 2022; 1 page; tequipment.net.
Tool.com; 13 Ton Hydraulic Crimper 50-400mm; Oct. 30, 2020; 7 pages; tool.com.

* cited by examiner

DRIVE PLATE SYSTEMS, METHODS, AND APPARATUS FOR A PRESS TOOL

RELATED APPLICATIONS

This application claims benefit of U.S. Provisional Application Ser. No. 63/478,892 filed Jan. 6, 2023, the contents of which are incorporated herein by reference.

TECHNICAL FIELD

The present invention relates to press tool systems, methods, and apparatus and, in particular, to a drive plate of a tool for removing the king pin from a king pin assembly.

BACKGROUND

The present invention relates to any press tool that comprises a threaded opening in drive plate, a threaded rod configured to engage the threaded opening, and a frame supported by the drive plate during operation of the press tool. The present invention is of particular significance when used as part of a king pin removal tool, and that application of the present invention will be described in detail herein. But the principles of the present invention may be applied to other press tools, such as bearing pullers, jaw pullers, clamps, or the like.

U.S. Pat. No. 9,511,488 to Andrews et al. ("the '488 patent") discloses a king pin removal tool for displacing a king pin along a king pin axis relative to an axle member and a knuckle assembly. The '488 patent is incorporated herein by reference.

A king pin removal tool such as the example king pin removal tool disclosed in the '488 patent comprises a drive plate defining a drive opening, an anchor plate, a drive member, a spacing system, and a stabilizing system. The drive member engages the drive plate such that rotation of the first drive member relative to the drive plate displaces the first drive member through the drive opening and along the king pin axis to displace the king pin along the king pin axis relative to the axle member and the knuckle assembly.

Accordingly, when using a drive pin removal tool such as that shown in the '488 patent, a rigid structure is defined by the drive plate, the anchor plate, and the spacing system. The knuckle assembly and axle member are supported by the anchor plate, the drive member is supported by the drive plate, and a distance between the anchor plate and the drive plate is fixed by the spacing system. In this example, the drive member threadingly engages a surface on the drive plate such that axial rotation of drive member relative to the drive plate applies a drive load to the king pin along the king pin axis. The drive load is thus transferred from the drive member to the drive plate through a threaded internal surface of the drive plate defining the drive opening.

The drive load required to remove a king pin from the axle member and the knuckle assembly is significant and may result in flexing of the drive plate. Flexing of the drive plate under the drive load may eventually result in failure of the drive plate and/or drive member, especially the threaded surfaces thereof. The drive plate is a relatively expensive part.

SUMMARY

The present invention may be embodied as a drive plate assembly for a king pin removal tool comprising a drive member. The drive plate assembly comprises a drive plate defining a main opening and a flange recess and an insert comprising a shaft portion and a flange portion and defining a drive opening. The insert is arranged such that the shaft portion is within the main opening, the flange portion is within the flange recess, and the drive member is adapted to be threaded into the drive opening. When the drive member is received within the drive opening and axially rotated relative to the insert, a drive force applied by the drive member forces the flange portion of the insert against a surface of the drive plate defining at least a portion of the flange recess.

The present invention may also be embodied as a method of forming a drive plate assembly for a king pin removal tool comprising a drive member, the method comprising the following steps. A drive plate defining a main opening and a flange recess is provided. An insert comprising a shaft portion and a flange portion and defining a drive opening is provided. The insert is arranged such that the shaft portion is within the main opening, the flange portion is within the flange recess, and the drive member is adapted to be threaded into the drive opening. When the drive member is received within the drive opening and axially rotated relative to the insert, displacing the drive member to apply a drive force to force the flange portion of the insert against a surface of the drive plate defining at least a portion of the flange recess.

DETAILED DESCRIPTION

Figure 1:
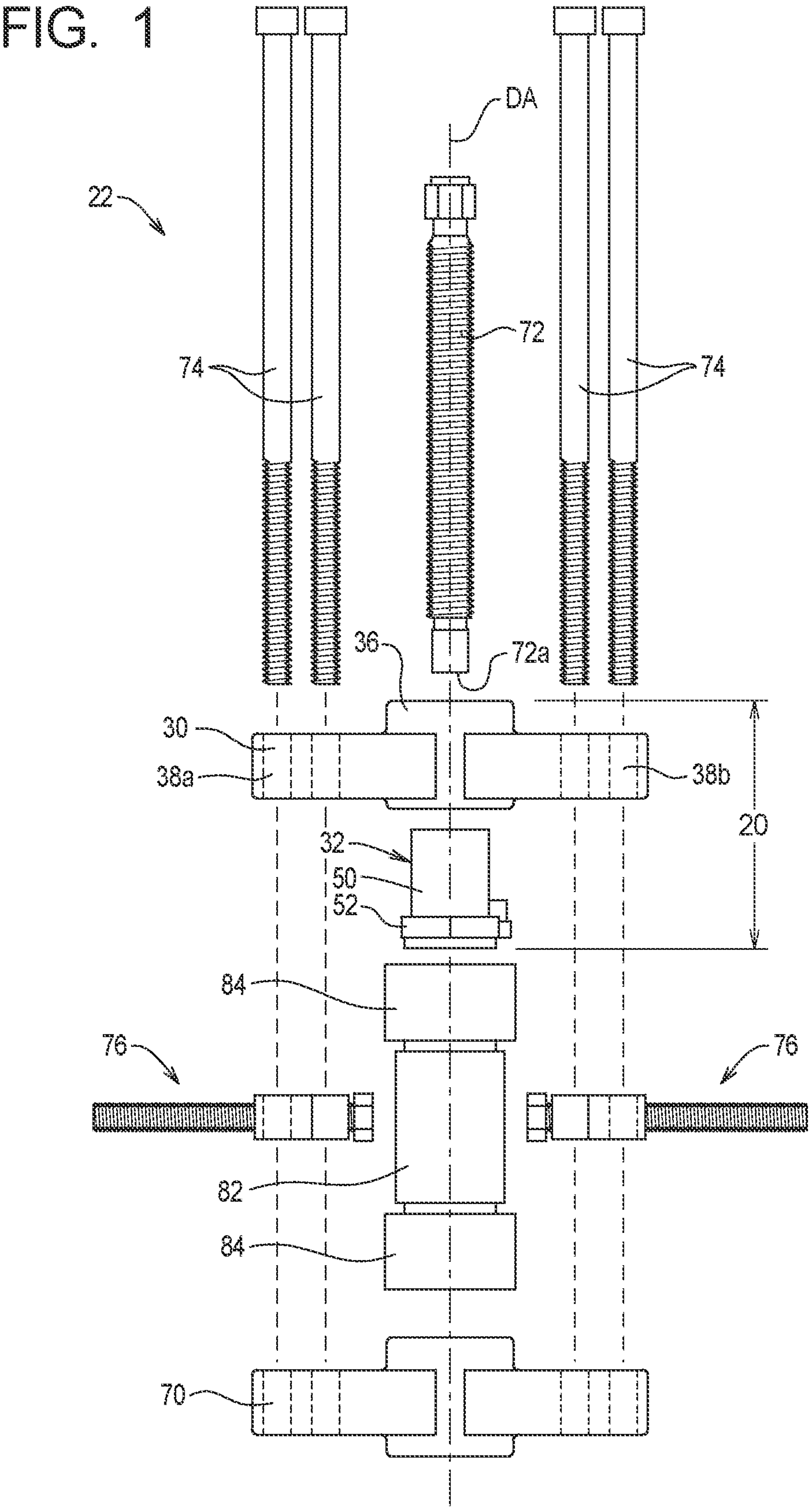
FIG. 1 is an exploded front elevation view depicting an example king pin removal tool incorporating a first example drive plate assembly of the present invention.
Figure 2:
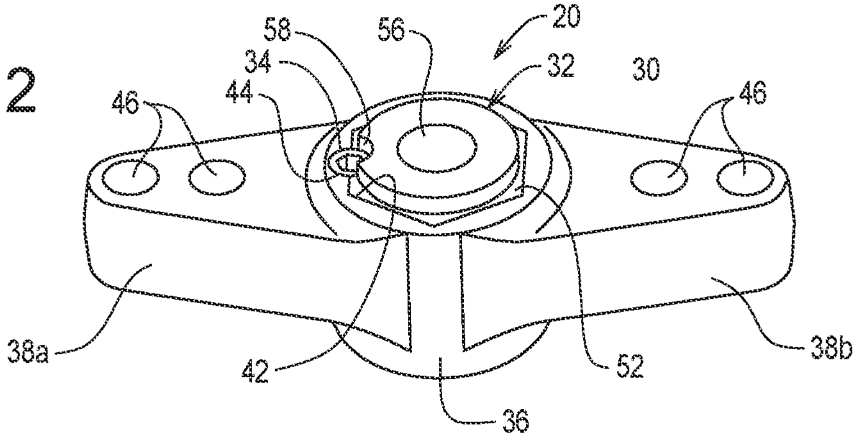
FIG. 2 is a perspective view of the first example drive plate assembly.
Figure 3:
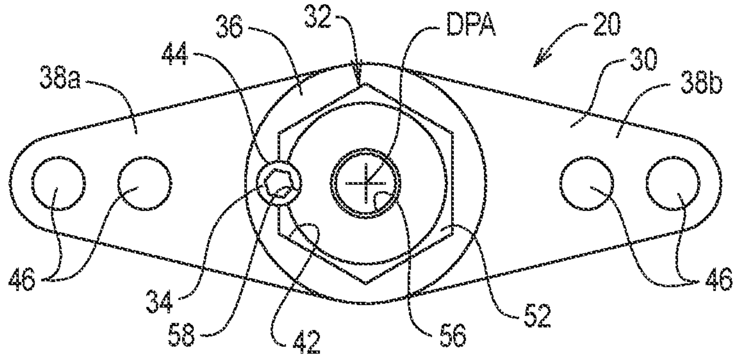
FIG. 3 is a bottom plan view of the first example drive plate assembly.
Figure 5:
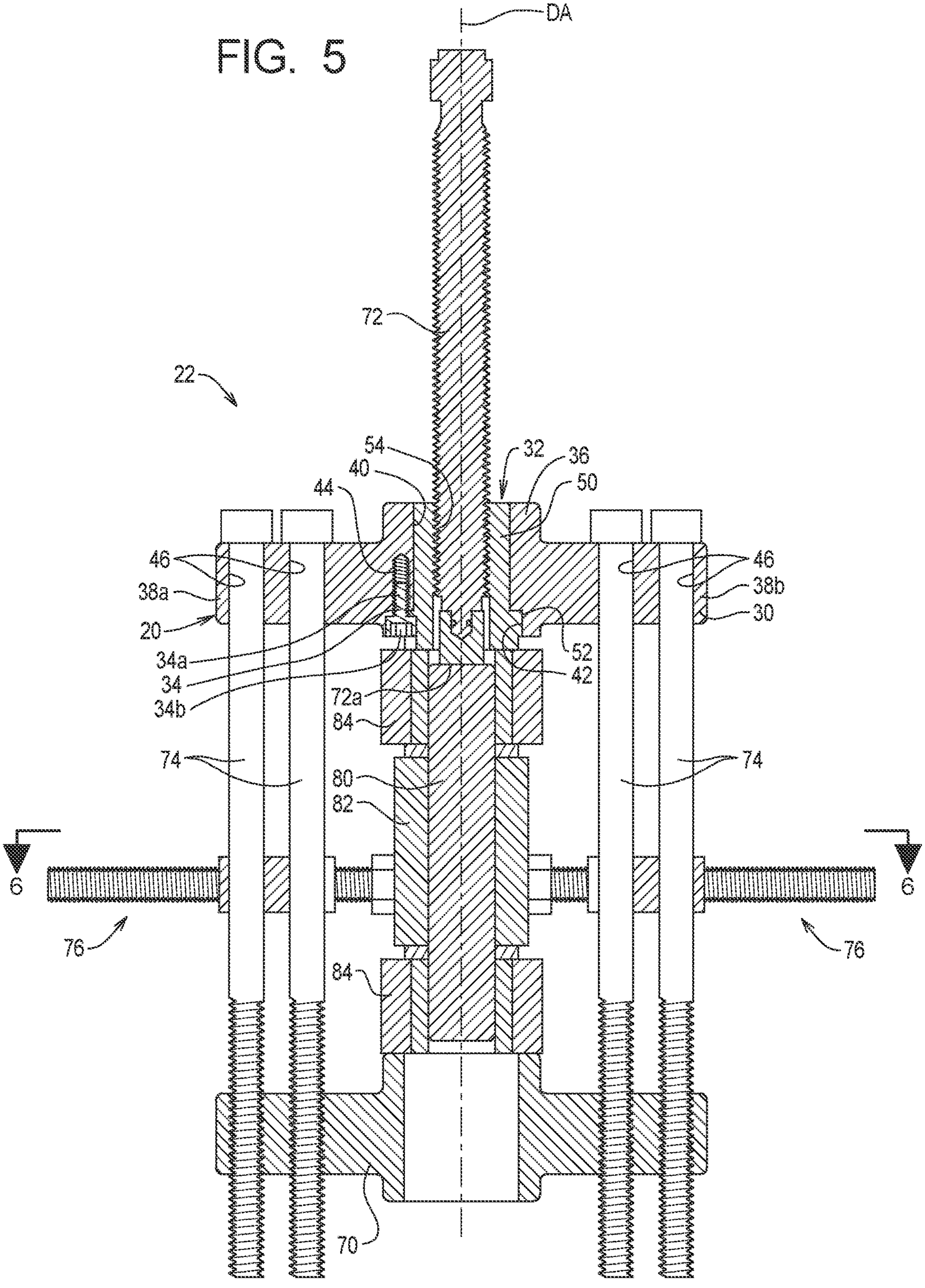
FIG. 5 is a vertical section view of the example king pin removal tool incorporating the first example drive plate assembly, the king pin removal tool depicted in FIG. 5 immediately prior to the process of removing a king pin.
Figure 6:
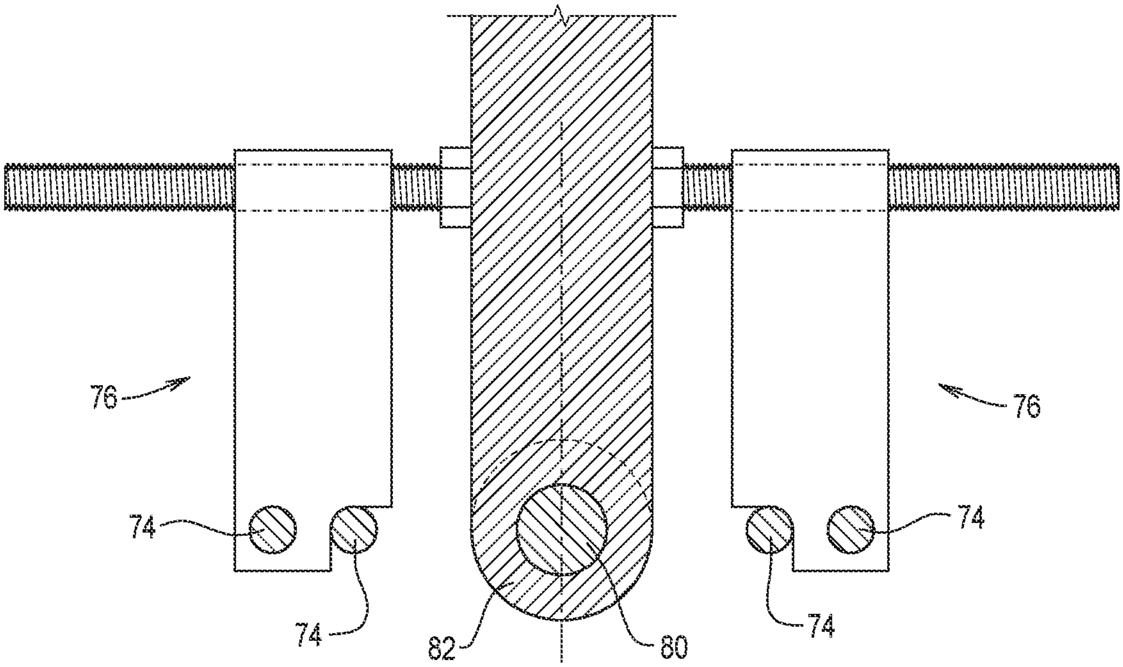
FIG. 6 is a section view taken along lines 6-6 in FIG. 5.
Figure 7:
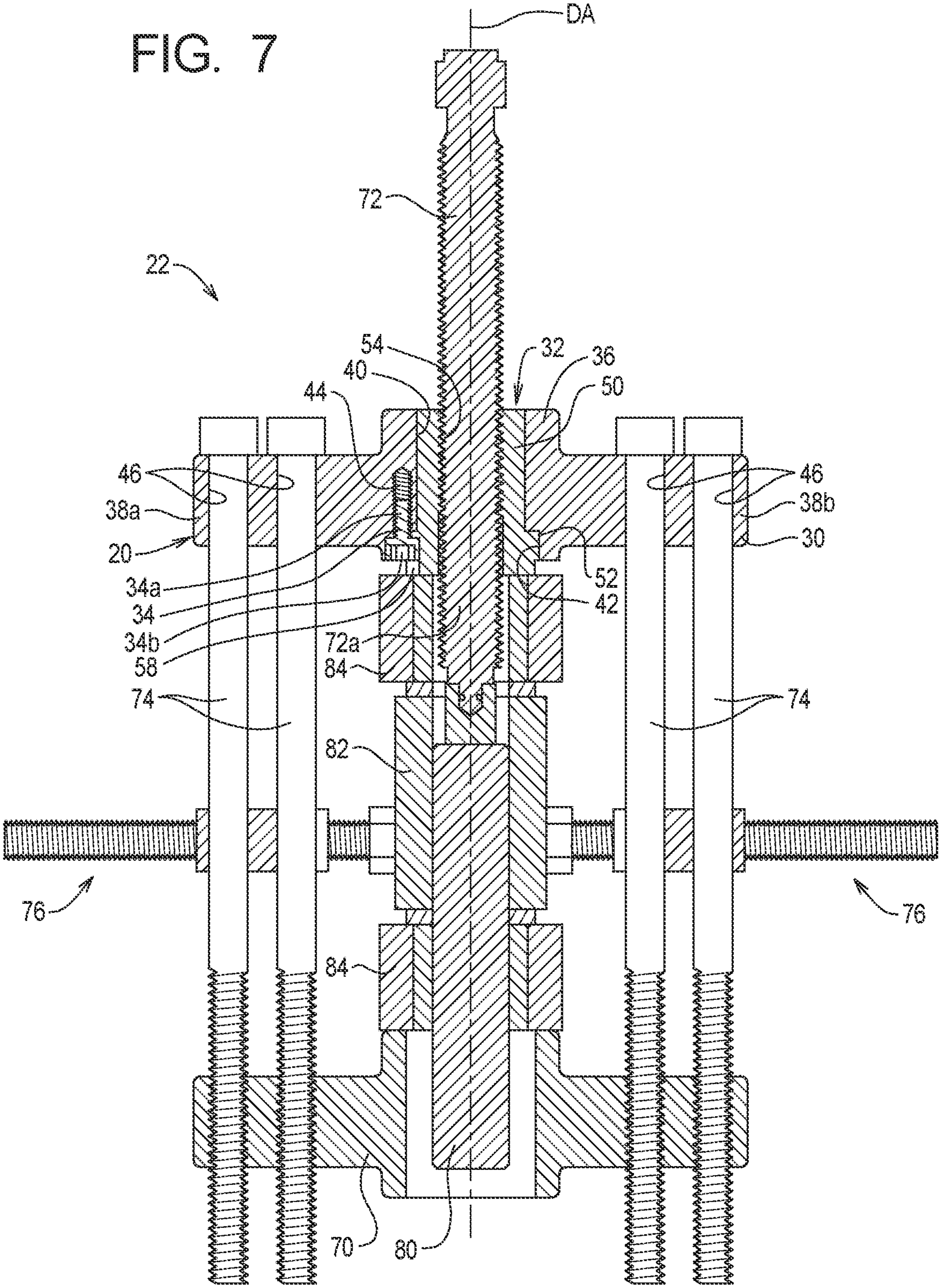
FIG. 7 is a vertical section view similar to that of FIG. 5, the king pin removal tool being depicted during the process of removing a king pin in FIG. 7.

Referring initially to FIGS. 1-3 of the drawing, depicted therein is a first example drive plate assembly 20 constructed in accordance with, and embodying, the principles of the present invention. The example drive plate assembly 20 as depicted in FIGS. 1, 5, and 7 illustrates the first example drive plate assembly 20 as part of a king pin removal tool 22. The example king pin removal tool 22 is or may be constructed and operated in the same manner as the king pin removal tool disclosed in the '488 patent and will be described herein only to that extent helpful to a complete understanding of the present invention.

Figure 4:
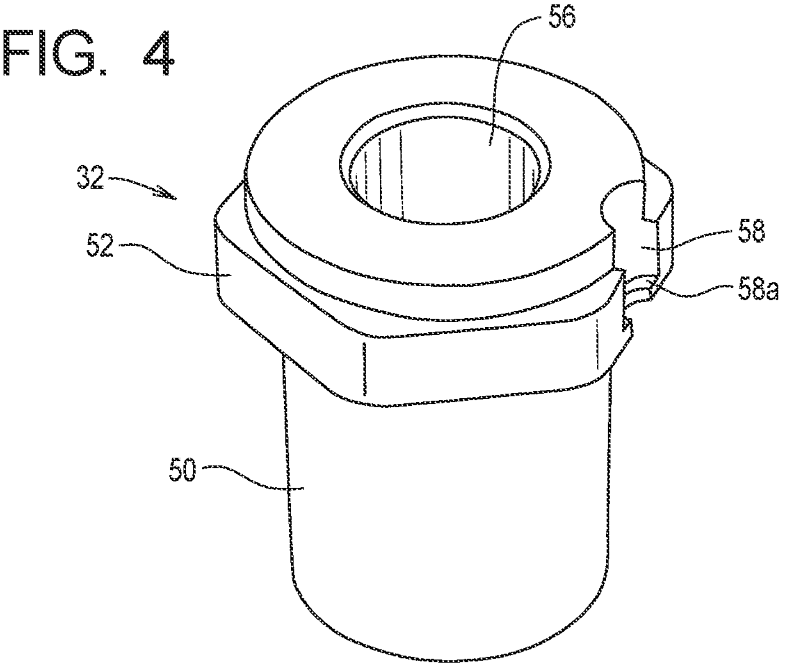
FIG. 4 is a perspective view of an insert forming part of the first example drive plate assembly.

As perhaps best shown in FIGS. 1-3, 5 and 7, the example drive plate assembly 20 comprises a drive plate 30, an insert 32, and at least one fastener 34. As shown in FIGS. 2 and 3, the example drive plate 30 is configured to define a central portion 36 and first and second wing portions 38*a* and 38*b* as best shown in FIGS. 1 and 2. FIG. 5 best illustrates that the example drive plate 30 defines a main opening 40, a flange recess 42, a fastener recess 44, and a plurality of brace openings 46. FIGS. 1, 4 and 5 best illustrate that the example insert 32 comprises a shaft portion 50, a flange portion 52, and an insert projection 54. FIGS. 3 and 4 illustrate that a drive opening 56 extends through the example insert 32. FIG. 4 further illustrates that the example insert 32 also defines a fastener recess, notch, or opening 58 and fastener surface 58*a*.

To allow the example drive plate 30 to accommodate the example insert 32, the example central portion 36 is generally cylindrical and has a diameter that is larger than that of a diameter of the main opening 40 of the drive plate 30. The example wing portions 38*a* and 38*b* are arranged to extend from the central portion 36. The central portion 36 and wing portions 38*a* and 38*b* are sized, dimensioned, and made of material capable of allowing the example drive plate 30 to bear the loads exerted on the drive plate 30 by the drive member 72 (through the insert member 32) and the spacing members 74 during use of the example king pin removal tool 22. As perhaps best shown in FIGS. 5 and 7, a dimension of the central portion 36 in a direction along the drive axis DA is greater than that of dimensions of the wing portions 38*a* and 38*b* in the direction along the drive axis DA. Although the example drive plate 30 comprises two wing members 38*a* and 38*b*, a drive plate of the present invention may be provided with more than two wing members and associated spacing members 74.

The example main opening 40 and a flange recess 42 of the example drive plate 30 are symmetrically arranged relative to and coaxially aligned with a drive plate axis DPA. The example fastener recess 44 and brace openings 46 are offset from the drive plate opening axis DPA. The shaft portion 50, the flange portion 52, and the insert projection 54 of the insert 32 are symmetrically arranged relative to and coaxially aligned with a drive axis DA.

Further, the example main opening 40 in the drive plate 30 and the example shaft portion 50 of the insert 32 are both cylindrical, with the example shaft portion 50 being sized and dimensioned to fit within the main opening 40.

FIGS. 5 and 7 illustrate that, with the insert 34 arranged within the main opening 40, a shaft portion 34*a* of the fastener is received by the fastener recess 44 and a head portion 34*b* of the fastener 34 engages the fastener surface 58*a* to inhibit movement of the insert 32 along the drive axis DA and out of the main opening 40 relative to the drive plate 30.

The example flange recess 42 defines a flange recess perimeter shape, and the example flange portion 52 of the insert 32 defines a flange portion perimeter shape. The flange portion perimeter shape is sized and dimensioned relative to the flange recess perimeter shape to allow the flange portion 52 to fit within flange recess 42. Further, the flange recess perimeter shape and the flange portion perimeter shape are configured to inhibit or prevent axial rotation of the insert 32 relative to the drive plate 30 during normal use of the example drive plate assembly 20. The flange portion perimeter shape of the example flange portion 52 and the example flange recess perimeter shape are both hexagonal, with the flange recess perimeter shape being slightly larger than the flange portion perimeter shape. Accordingly, the example flange recess 42 and the example flange portion 52 define complementary corners, points, projections, surfaces or the like that engage each other to inhibit rotation of the insert 32 relative to the drive plate 30 about the drive axis DA.

The example fastener 34 is adapted to extend through the fastener recess, notch, or opening 58 and into the fastener recess 44 to detachably attach the insert 32 to the drive plate 30 when the shaft portion 50 is within the main opening 40 and the flange portion 52 is within the flange recess 42. The example fastener 34 further engages at least the example fastener recess, notch, or opening 58 to inhibit or prevent axial rotation of the insert 32 relative to the drive plate 30 during normal use of the example drive plate assembly 20.

The example drive opening 56 is substantially cylindrical and threaded. Further, when the shaft portion 50 is within the main opening 40 and the flange portion 52 is within the flange recess 42, the drive opening 56 is substantially coaxially aligned with the main opening 40 such that the drive plate axis DPA and drive axis DA are coaxially aligned.

As shown in FIGS. 1, 5, and 7, in addition to the first example drive plate assembly 20, the example king pin removal tool 22 further comprises an anchor plate 70, a drive member 72, a plurality of spacing members 74, and a plurality of brace assemblies 76. The example king pin removal tool 22 comprises two sets of two spacing members 74, one set arranged on each side of the drive plate 30 in a symmetrical manner. FIGS. 1, 5, and 7 further illustrate an example king pin 80, axle member 82, and knuckle assembly 84.

When the example king pin removal tool 22 is formed, the drive plate 30 is supported by the spacing members 74 such that the flange recess 42 faces the anchor plate 70. The insert 32 is then arranged such that the shaft portion 50 is within the main opening 40 and the flange portion 52 is within the flange recess 42. The fastener 34 is then inserted at least partly through recess, notch, or opening 58 and threaded into the fastener recess 44 to detachably attach the insert 32 to the drive plate 30. At this point, the insert projection 54 faces the anchor plate 70. The example drive member 72 is then threaded into the drive opening 56 such that a drive end 72*a* thereof is arranged between the insert 32 and the anchor plate 70.

When removing the example king pin 80 from the axle member 82 and knuckle assembly 84, the king pin 80 is arranged between the drive end 72*a* of the drive member 72 and coaxially aligned with the drive axis DA and the knuckle assembly 84 supported by the anchor plate 70. Further axial rotation of the drive member 72 forces the king pin 80 out of the axle member 82 and the knuckle assembly 84.

The use of the insert member 32 at least partly isolates any flexing of the drive plate 30 from the interface of the threaded outer surface of the drive member 72 and the threaded inner surface defining the drive opening 56 of the insert 32. And should the threaded interface formed by the drive member 72 and the insert 32 fail or otherwise become unusable, the drive plate assembly 20 may be repaired by replacing the failed drive member 72 and/or insert 32 with a new drive member 72 and/or insert 32. In comparison with the cost of the drive plate 30, the drive member 72 and insert are relatively inexpensive.

What is claimed is:

1. A drive plate assembly for a king pin removal tool comprising a drive member, the drive plate assembly comprising:
- a drive plate defining a main opening and a flange recess;
- an insert comprising a shaft portion and a flange portion and defining a drive opening; wherein
- the insert is arranged such that
  - the shaft portion is within the main opening,
  - the flange portion is within the flange recess,
  - the drive member is adapted to be threaded into the drive opening, and the flange portion and the flange recess are configured to inhibit rotation of the insert relative to the drive plate; and when the drive member is received within the drive opening and axially rotated relative to the insert, a drive force applied by the drive member forces the flange portion of the insert against a surface of the drive plate defining at least a portion of the flange recess.

2. A drive plate assembly as recited in claim 1, in which:

the flange portion defines a flange portion perimeter shape;

the flange recess defines a flange recess perimeter shape; and the flange portion perimeter shape and the flange recess perimeter shape are configured such that the flange portion engages the drive plate to inhibit rotation of the insert relative to the drive plate.

3. A drive plate assembly as recited in claim 1, in which:

the flange portion defines a first hexagonal shape;

the flange recess defines a second hexagonal shape; and the second hexagonal shape is configured relative to the first hexagonal shape such that the flange portion is received within the flange recess and the flange portion engages the drive plate to inhibit rotation of the insert relative to the drive plate.

4. A drive plate assembly as recited in claim 1, further comprising a fastener arranged to secure the insert to the drive plate.

5. A drive plate assembly as recited in claim 4, in which the drive plate defines a fastener recess that engages the fastener to secure the insert to the drive plate.

6. A drive plate assembly as recited in claim 4, in which the insert defines a fastener surface, where the fastener engages the fastener surface to secure the insert to the drive plate.

7. A drive plate assembly as recited in claim 4, in which:

the drive plate defines a fastener recess;

the insert defines a fastener surface; wherein a shaft of the fastener engages the fastener recess to secure the fastener to the drive plate; and a head of the fastener engages the fastener surface to secure the insert relative to the drive plate.

8. A drive plate assembly as recited in claim 7, in which the insert defines a fastener recess configured to accommodate the head portion of the fastener when the head portion of the fastener engages the fastener surface.

9. A drive plate assembly as recited in claim 4, in which the insert defines a fastener recess to accommodate at least a portion of the fastener.

10. A method of forming a drive plate assembly for a king pin removal tool comprising a drive member, the method comprising the steps of:

providing a drive plate defining a main opening and a flange recess;

providing an insert comprising a shaft portion and a flange portion and defining a drive opening;

arranging the insert such that the shaft portion is within the main opening, the flange portion is within the flange recess, the drive member is adapted to be threaded into the drive opening, and the flange portion and the flange recess are configured to inhibit rotation of the insert relative to the drive plate; and when the drive member is received within the drive opening and axially rotated relative to the insert, displacing the drive member to apply a drive force to force the flange portion of the insert against a surface of the drive plate defining at least a portion of the flange recess.

11. A method as recited in claim 10, in which:

the flange portion defines a flange portion perimeter shape;

the flange recess defines a flange recess perimeter shape; and the flange portion perimeter shape and the flange recess perimeter shape are configured such that the flange portion engages the drive plate to inhibit rotation of the insert relative to the drive plate.

12. A method as recited in claim 10, in which:

the flange portion defines a first hexagonal shape;

the flange recess defines a second hexagonal shape; and the second hexagonal shape is configured relative to the first hexagonal shape such that the flange portion is received within the flange recess and the flange portion engages the drive plate to inhibit rotation of the insert relative to the drive plate.

13. A method as recited in claim 10, further comprising the step of arranging a fastener to secure the insert to the drive plate.

14. A method as recited in claim 13, in which the drive plate defines a fastener recess that engages the fastener to secure the insert to the drive plate.

15. A method as recited in claim 13, in which the insert defines a fastener surface, where the fastener engages the fastener surface to secure the insert to the drive plate.

16. A method as recited in claim 13, in which:

the drive plate defines a fastener recess;

the insert defines a fastener surface; wherein a shaft of the fastener engages the fastener recess to secure the fastener to the drive plate; and a head of the fastener engages the fastener surface to secure the insert relative to the drive plate.

17. A method as recited in claim 16, in which the insert defines a fastener recess configured to accommodate the head portion of the fastener when the head portion of the fastener engages the fastener surface.

18. A method as recited in claim 13, in which the insert defines a fastener recess to accommodate at least a portion of the fastener.

19. A drive plate assembly for a king pin removal tool comprising a drive member, the drive plate assembly comprising:

a drive plate defining a main opening and a flange recess;

an insert comprising a shaft portion and a flange portion and defining a drive opening; wherein the flange portion defines a flange portion perimeter shape;

the flange recess defines a flange recess perimeter shape;

the insert is arranged such that the shaft portion is within the main opening, the flange portion is within the flange recess, the drive member is adapted to be threaded into the drive opening, and the flange portion perimeter shape and the flange recess perimeter shape are configured such that the flange portion engages the drive plate to inhibit rotation of the insert relative to the drive plate; and when the drive member is received within the drive opening and axially rotated relative to the insert, a drive force applied by the drive member forces the flange portion of the insert against a surface of the drive plate defining at least a portion of the flange recess.

20. A drive plate assembly as recited in claim 19, in which:

the flange portion perimeter shape defines a first hexagonal shape;

the flange recess perimeter shape defines a second hexagonal shape; and the second hexagonal shape is configured relative to the first hexagonal shape such that the flange portion is received within the flange recess and the flange portion engages the drive plate to inhibit rotation of the insert relative to the drive plate.

21. A drive plate assembly as recited in claim 19, further comprising a fastener arranged to secure the insert to the drive plate.

22. A method of forming a drive plate assembly for a king pin removal tool comprising a drive member, the method comprising the steps of:

providing a drive plate defining a main opening and a flange recess;

providing an insert comprising a shaft portion and a flange portion and defining a drive opening;

configuring the flange portion to define a flange portion perimeter shape;

configuring the flange recess to define a flange recess perimeter shape;

arranging the insert such that the shaft portion is within the main opening, the flange portion is within the flange recess, the drive member is adapted to be threaded into the drive opening, and the flange portion perimeter shape and the flange recess perimeter shape are configured such that the flange portion engages the drive plate to inhibit rotation of the insert relative to the drive plate; and when the drive member is received within the drive opening and axially rotated relative to the insert, displacing the drive member to apply a drive force to force the flange portion of the insert against a surface of the drive plate defining at least a portion of the flange recess.

23. A method as recited in claim 22, in which:

the flange portion perimeter shape defines a first hexagonal shape;

the flange recess perimeter shape defines a second hexagonal shape; and the second hexagonal shape is configured relative to the first hexagonal shape such that the flange portion is received within the flange recess and the flange portion engages the drive plate to inhibit rotation of the insert relative to the drive plate.

24. A method as recited in claim 22, further comprising the step of arranging a fastener to secure the insert to the drive plate.

* * * * *